United States Patent
Nakano et al.

(10) Patent No.: US 11,951,888 B2
(45) Date of Patent: Apr. 9, 2024

(54) VEHICLE SEAT

(71) Applicant: TS TECH CO., LTD., Asaka (JP)

(72) Inventors: Toyokazu Nakano, Tochigi (JP); Haruki Mochizuki, Tochigi (JP)

(73) Assignee: TS TECH CO., LTD., Saitama (JP)

(*) Notice: Subject to any disclaimer, the term of this patent is extended or adjusted under 35 U.S.C. 154(b) by 916 days.

(21) Appl. No.: 16/716,000

(22) Filed: Dec. 16, 2019

(65) Prior Publication Data
US 2020/0114791 A1 Apr. 16, 2020

Related U.S. Application Data

(62) Division of application No. 14/384,330, filed as application No. PCT/JP2013/057201 on Mar. 14, 2013, now Pat. No. 10,549,665.

(30) Foreign Application Priority Data

Mar. 15, 2012 (JP) .................................. 2012-058659

(51) Int. Cl.
*B60N 2/68* (2006.01)
*A61H 23/00* (2006.01)
(Continued)

(52) U.S. Cl.
CPC ............... *B60N 2/68* (2013.01); *A61H 23/00* (2013.01); *A61H 23/02* (2013.01);
(Continued)

(58) Field of Classification Search
CPC ........ B60N 2/448; B60N 2/7094; B60N 2/68; A61H 23/00; A61H 23/0263;
(Continued)

(56) References Cited

U.S. PATENT DOCUMENTS 2,891,538 A * 6/1959 Moxley .............. A61H 23/0254
601/56
2,910,977 A 11/1959 Jeter
(Continued)

FOREIGN PATENT DOCUMENTS

CN 1585611 2/2005
CN 1960897 A * 5/2007 ............. B60R 11/02
(Continued)

OTHER PUBLICATIONS

English translation for JP 2010111263, translated by Search engine via Clarivate Analytics, translated on Sep. 13, 2022.*
(Continued)

*Primary Examiner* — Tu A Vo
(74) *Attorney, Agent, or Firm* — Hamre, Schumann, Mueller & Larson, P.C.

(57) ABSTRACT

A vehicle seat includes a seat cushion S1 and a seat back S2. The seat back S2 includes a seat back frame F2 constituting a framework thereof, a pressure-receiving member 30 located in the seat back frame F2 and designed to support an upper body of an occupant, elastically supporting members 26, 27 elastically supporting the pressure-receiving member 30 in the seat back frame F2, and a cover material covering the seat back frame F2 and the pressure-receiving member 30. The seat back is configured such that when a backward movement load is applied from the upper body of the occupant seated on the seat cushion S1 to the seat back S2, the pressure-receiving member 30 moves backward to allow the upper body of the occupant to sink into the seat back S2. A vibrating unit 50 is attached to the pressure-receiving member 30.

14 Claims, 12 Drawing Sheets

(51) Int. Cl.
*A61H 23/02* (2006.01)
*B60N 2/70* (2006.01)
*B60N 2/90* (2018.01)

(52) U.S. Cl.
CPC ....... *A61H 23/0263* (2013.01); *B60N 2/7094* (2013.01); *B60N 2/976* (2018.02); *A61H 2201/0149* (2013.01); *A61H 2201/1215* (2013.01); *A61H 2201/1623* (2013.01); *A61H 2201/1654* (2013.01); *A61H 2205/081* (2013.01)

(58) Field of Classification Search
CPC ...... A61H 2201/0149; A61H 2205/081; A61H 2201/1654; A61H 2023/002; A61H 23/004; A61H 23/006; A61H 23/02; A61H 23/0254; A61H 2023/0272; A61H 2023/0281; A61H 23/04; A61H 2201/0138; A61H 2201/0142; A61H 2201/0146; A61H 2201/12; A61H 2201/1215; A61H 2201/1207; A61H 2203/0425
See application file for complete search history.

(56) References Cited

U.S. PATENT DOCUMENTS

| | | | |
|---|---|---|---|
| 2,921,578 A | 1/1960 | Rabhan | |
| 2,937,641 A * | 5/1960 | Oetinger | A47C 1/143 297/89 |
| 3,035,572 A | 5/1962 | Houghtaling | |
| 3,075,101 A | 1/1963 | Neff | |
| 3,194,522 A | 7/1965 | Azneer | |
| 3,389,699 A | 6/1968 | Mathers | |
| 3,405,709 A * | 10/1968 | Mathers | A63B 21/0605 601/99 |
| 3,613,673 A * | 10/1971 | La Hue | A61H 23/02 601/59 |
| 4,681,096 A | 7/1987 | Cuervo | |
| 4,787,106 A * | 11/1988 | Paxon | A47C 7/425 5/648 |
| 5,713,832 A | 2/1998 | Jain | |
| 5,935,089 A | 8/1999 | Shimizu | |
| 6,087,942 A * | 7/2000 | Sleichter, III | G08B 21/06 340/576 |
| 6,363,559 B1 | 4/2002 | Saxon | |
| 6,669,291 B1 | 12/2003 | Hsiao | |
| 6,682,494 B1 * | 1/2004 | Sleichter, III | B60N 2/976 297/217.3 |
| 6,918,884 B2 | 7/2005 | Knelsen et al. | |
| 8,550,552 B2 | 10/2013 | Nitsuma | |
| 8,590,979 B2 | 11/2013 | Matsumoto et al. | |
| 2002/0107458 A1* | 8/2002 | Flick | B60N 2/66 601/46 |
| 2003/0055364 A1* | 3/2003 | Knelsen | B60N 2/666 601/46 |
| 2007/0284930 A1 | 12/2007 | Christianson et al. | |
| 2009/0108654 A1 | 4/2009 | Petzel et al. | |
| 2010/0181810 A1 | 7/2010 | Yasuda et al. | |
| 2010/0187876 A1 | 7/2010 | Nitsuma | |
| 2011/0118641 A1* | 5/2011 | Gomez, Jr. | A61H 1/0292 602/32 |
| 2012/0038199 A1* | 2/2012 | Matsumoto | B60N 2/4228 297/452.18 |

FOREIGN PATENT DOCUMENTS

| | | | |
|---|---|---|---|
| DE | 3713370 A1 * | 11/1987 | |
| DE | 19829831 A1 | 1/2000 | |
| DE | 10297209 T5 | 9/2004 | |
| DE | 10320371 A1 * | 12/2004 | A61H 23/0263 |
| EP | 1475066 A2 * | 11/2004 | A61H 23/0263 |
| GB | 2437158 A * | 10/2007 | B06B 3/00 |
| JP | S48068321 | 8/1973 | |
| JP | S57166770 | 10/1982 | |
| JP | S59079048 | 5/1984 | |
| JP | S60054453 | 4/1985 | |
| JP | S6033662 Y2 | 10/1985 | |
| JP | S60190329 | 12/1985 | |
| JP | S61196741 | 12/1986 | |
| JP | H01-080134 U | 5/1989 | |
| JP | H0263845 U | 5/1990 | |
| JP | H05-082341 U | 11/1993 | |
| JP | H05086253 | 11/1993 | |
| JP | H07-124035 | 5/1995 | |
| JP | H0729900 Y2 | 7/1995 | |
| JP | H0889548 A | 4/1996 | |
| JP | H09038168 | 2/1997 | |
| JP | H09266935 | 10/1997 | |
| JP | 2003070859 | 3/2003 | |
| JP | 2006006990 | 1/2006 | |
| JP | 2010111263 A * | 5/2010 | |
| JP | 2010168004 | 8/2010 | |
| KR | 0184543 B1 * | 7/1997 | |
| WO | 9740807 A1 | 11/1997 | |
| WO | 2010122858 A1 | 10/2010 | |

OTHER PUBLICATIONS

English translation for DE 3711370, translated by Search engine via Clarivate Analytics, translated on Sep. 13, 2022.*
English translation for CN 1960897, translated by Search engine via Clarivate Analytics, translated on Sep. 13, 2022.*
English translation for DE 10320371, translated by Search engine via Clarivate Analytics, translated on Sep. 13, 2022.*
English translation for KR 0184543, machine translated by Search Clarivate Analytics, translated on Mar. 25, 2023.*
Second Office Action issued for Japanese Patent Application No. 2020-170727, dated Mar. 8, 2022, 7 pages including English translation.
Japanese Office Action, issued in the corresponding Japanese Patent Application No. 2019-186542, dated Jun. 23, 2020, 7 pages (including English translation).
Office Action issued for Japanese Patent Application No. 2020-170727, dated Aug. 17, 2021, 7 pages including English translation.
Office Action issued in counterpart Japanese Patent Application No. 2012-058659 dated Nov. 24, 2015 and corresponding English translation.
Office Action issued in counterpart Japanese Patent Application No. 2011-289863 dated Dec. 22, 2015 and corresponding English translation.
Office Action issued in counterpart Chinese Patent Application No. 201380014386.5 dated Feb. 3, 2016, and corresponding English translation.
Office Action issued for Japanese Patent Application No. 2016-049195, dated Aug. 29, 2017, 12 pages including English translation.
Decision of Refusal issued for Japanese Patent Application No. 2016-049195, dated Mar. 20, 2018, 4 pages Including English translation.
Decision of Dismissal of Amendment issued for Japanese Patent Application No. 2016-049195, dated Mar. 20, 2018, 10 pages including English translation.
Notification of Reasons for Refusal issued for Japanese Patent Application No. 2018-116853, dated Jun. 4, 2019, 6 pages including English translation.
Notice of Reasons for Refusal issued for Japanese Patent Application No. 2022-132713, Dispatch Date: Nov. 14, 2023, 10 pages including English machine translation.
Office Action issued for German Patent Application No. 112013001427.0, dated Feb. 22, 2024, 11 pages including English machine translation.

* cited by examiner

VEHICLE SEAT

TECHNICAL FIELD

The present invention relates to a vehicle seat such as a car seat, at least comprising a seat cushion and a seat back, and in particular to a vehicle seat which can transmit vibration from the seat back to an upper body of an occupant seated on the seat cushion.

BACKGROUND ART

As a vehicle seat comprising a seat cushion and a seat back, there is a conventionally-known vehicle seat in which a vibrator configured to impart vibration for massage to an upper body of an occupant seated on the seat cushion is embedded in the seat back (see, for example, Patent Literature 1).

Herein, the car seat described in Patent Literature 1 includes a seat back frame constituting a framework of the seat back, upper and lower reinforcement frames laterally bridges right and left sides of the seat back frame, a frame member attached to the upper and lower reinforcement frames, for example, by clips, and a vibrator retained in the frame member via spring members.

CITATION LIST

Patent Literature

Patent Literature 1: Japanese Laid-open Utility Model Application, Publication No. 61-196741

SUMMARY OF THE INVENTION

In the vehicle seat described in Patent Literature 1, while the upper body of the occupant is supported from behind by the frame member, the vibrator (vibrating unit) is retained in the frame member via the spring members, so that the vibration from the vibrator may be disadvantageously absorbed by the spring members before being transmitted to the frame member; therefore, there is a concern about decreased vibration transmission efficiency to the upper body of the occupant.

Further, since the dedicated spring members are used for attaching the vibrator to the frame member, there is a problem that the number of parts will be increased.

Further, if the vibrating unit interferes with a peripheral member, an abnormal noise occurs or the occupant feels uncomfortable; it is therefore desirable to make the vibrating unit less likely to interfere with the peripheral member.

The present invention has been made in view of the above background, and it is an object of the present invention to provide a vehicle seat, in which desired vibration can be efficiently transmitted from the seat back to the upper body of an occupant seated on the seat cushion, the vibrating unit is less likely to interfere with a peripheral member, and the number of parts can be reduced.

To achieve the above object, a vehicle seat according to the present invention comprises a seat cushion and a seat back, wherein the seat back comprises a seat back frame constituting a framework thereof, a pressure-receiving member located in the seat back frame and configured to support an upper body of an occupant, an elastically supporting member elastically supporting the pressure-receiving member in the seat back frame, and a cover material covering the seat back frame and the pressure-receiving member, wherein the seat back is configured such that when a backward movement load is applied from the upper body of the occupant seated on the seat cushion to the seat back, the pressure-receiving member moves backward to allow the upper body of the occupant to sink into the seat back, and wherein a vibrating unit is attached to the pressure-receiving member.

In the vehicle seat according to the present invention, the vibrating unit is attached to a member which is configured to allow the upper body of the occupant to sink into the seat back by receiving a load from the upper body of the occupant when a backward movement load acts on the seat back, and to which the pressure from the upper body of the occupant is sufficiently transmitted. For this reason, when the vibrating unit operates with the upper body of the occupant seated on the seat cushion being supported by the seat back, vibration generated from the vibrating unit is entirely and directly transmitted to the pressure-receiving member by which the load from the upper body of the occupant is received, in such a manner that the vibration is efficiently transmitted from the pressure-receiving member to the upper body of the occupant via the cover material. Further, since attachment of the vibrating unit to the pressure-receiving member does not require spring members, the number of parts can be reduced.

The cover material according to the present invention may include a cushion pad, a skin material provided outside the cushion pad, a back cover covering the back side of the seat, and the like.

In order to suppress interference of the vibrating unit and the cover material to stably operate the vibrating unit, in the above vehicle seat, it is preferable that an interference suppressing member configured to suppress interference of the vibrating unit and the cover material is provided between the vibrating unit and the cover material. The interference suppressing member may be a first cover member configured to cover the vibrating unit.

With this configuration, the vibrating unit operates stably.

Further, in a case where the interference suppressing member is made by the first cover member covering the vibrating unit, the vibrating unit operates more stably with a simple structure.

In the above vehicle seat, a recess portion may be integrally formed with the pressure-receiving member, and at least a portion of the vibrating unit may be accommodated in this recess portion.

With this configuration, interference of a portion of the vibrating unit and the cover material can be suppressed while the rigidity of the pressure-receiving member is enhanced. Further, the size of the vehicle seat can be reduced by using a space in the recess portion.

In the above vehicle seat, the vibrating unit may be disposed backward of a pressure-receiving surface of the pressure-receiving member.

With this configuration, the occupant does not feel uncomfortable which feeling would otherwise be caused due to the vibrating unit contacting the upper body of the occupant.

The vibrating unit may employ various types of vibration generators, such as of an electromagnetic type, an eccentric cam type, and a low frequency speaker type. For example, the vibrating unit may be a vibrating motor including a motor body, and an eccentric weight attached to a rotary shaft extending from the motor body. In this configuration, the first cover member covering the vibrating motor may preferably include a motor cover portion configured to cover the motor body, and a weight cover portion configured to protrude outward from the motor cover portion to cover a region in which the eccentric weight rotates.

With this configuration, the motor cover portion of the first cover member covers the motor body of the vibrating unit, and the weight cover portion of the first cover member protrudes outward from the motor cover portion to cover the region in which the eccentric weight of the vibrating unit rotates; this configuration makes it possible to reduce the size of the first cover member as well as to suppress interference with the cover material due to vibration of the eccentric weight.

In the above vehicle seat, the pressure-receiving member may have the recess portion which opens frontward, and a mounting bracket for attaching to the pressure-receiving member may be attached to the vibrating unit, and further the mounting bracket may be attached to the periphery of the recess portion of the pressure-receiving member with the vibrating unit accommodated in the recess portion of the pressure-receiving member.

This configuration is preferable because the interference of the vibrating unit and the cover material is suppressed. Further, since this configuration does not require a separate interference suppressing member for suppressing interference of the vibrating unit and the cover material, the number of parts can be reduced.

Further, the vehicle seat may further comprise a second cover member configured to cover the recess portion in which the vibrating unit is accommodated, from outside the mounting bracket.

This configuration makes it possible to suppress the interference of the vibrating unit and the cover material, while preventing dust from entering the recess portion.

Further, the pressure-receiving member may include fixing members for the mounting bracket to be fixed thereto, and the fixing members may be provided around the recess portion by insert molding.

With this configuration, the attachment operation for the mounting bracket is easily performed, and thanks to the enhanced rigidity of the pressure-receiving member the vibration from the vibrating unit can be efficiently transmitted to the entire pressure-receiving member.

Further, the vibrating unit may be disposed at a position avoiding the elastically supporting member.

With this configuration, since the elastically supporting member does not obstruct the assembly of the vibrating unit, the workability for assembling the vibrating unit can be improved.

Further, the elastically supporting member may be made of two wire members disposed above and below the vibrating unit to place the vibrating unit between them.

With this configuration, the vibration from the vibrating unit is easily transmitted to the two wire members.

Herein, the elastically supporting member may be provided to connect right and left portions of the seat back frame, and the pressure-receiving member may include a retaining portion configured to retain the elastically supporting member, the retaining portion and the vibrating unit being arranged one above another.

With this configuration, the pressure-receiving member retains the elastically supporting member at an area where large vibration generates in the pressure-receiving member, it is possible to suppress an abnormal noise from being generated due to interference of the pressure-receiving member and a wire member.

In the above vehicle seat, the vibrating unit may be attached to the elastically supporting member such that a longitudinal direction of an attaching portion of the vibrating unit is a direction intersecting a direction in which the elastically supporting member is laid.

With this configuration, since the vibrating unit can vibrate a narrow area of the elastically supporting member where the pressure-receiving member is elastically supported in the seat back frame, the elastically supporting member vibrates largely. Accordingly, the vibrating efficiency can be improved.

The above vehicle seat may further comprise right and left seat back side frames constituting right and left frames of the seat back, and a plate-like pressure-receiving member located between and attached to the right and left seat back side frames via a support wire which laterally bridges the right and left seat back side frames and functions as the elastically supporting member, and the vibrating unit may be attached to a lateral center portion of a rear surface of the pressure-receiving member with the longitudinal direction of the attaching portion of the vibrating unit being an upper-lower direction.

With this configuration, the support wire for attaching the pressure-receiving member to the right and left seat back side frames is used as the elastically supporting member to improve the vibrating efficiency. Further, since the vibrating unit is attached to the rear surface of the pressure-receiving member, the vibrating unit can be more readily and more stably attached to the pressure-receiving member than the configuration in which the vibrating unit is directly attached to the pressure-receiving member.

In the above vehicle seat, the pressure-receiving member may curve such that a rear surface thereof is recessed in the vertical section, and the vibrating unit may be attached to a vertical center portion of the rear surface of the pressure-receiving member.

With this configuration, since the amount of backward protrusion of the vibrating unit can be reduced, it is possible to prevent the seat equipped with the vibrating unit from enlarging in size in the front-rear direction.

According to another aspect of the present invention, a vehicle seat comprises a seat cushion and a seat back, wherein the seat back comprises a seat back frame constituting a framework thereof, an elastically supporting member configured to be deformable and located in the seat back frame in such a manner as to bridge right and left sides of the seat back frame, and a vibrating unit configured to impart vibration to an occupant, and wherein the vibrating unit is attached to the elastically supporting member such that a longitudinal direction of an attaching portion of the vibrating unit is a direction intersecting a direction in which the elastically supporting member is laid.

In the vehicle seat according to another aspect of the present invention, the vibrating unit is attached to a member configured to allow the upper body of the occupant to sink into the seat back by receiving a load from the upper body of the occupant when a backward movement load acts on the seat back, wherein the pressure from the upper body of the occupant is sufficiently transmitted to the member. For this reason, when the vibrating unit operates with the upper body of the occupant seated on the seat cushion being supported by the seat back, vibration generated from the vibrating unit is entirely and directly transmitted to the pressure-receiving member by which the load from the upper body of the occupant is received, in such a manner that the vibration is efficiently transmitted to the upper body of the occupant. Further, since attachment of the vibrating unit to the pressure-receiving member does not require spring members, the number of parts can be reduced.

Further, since the vibrating unit can vibrate a narrow area of the elastically supporting member configured to be deformable and located in the seat back frame in such a manner as to bridge right and left sides of the seat back frame, the elastically supporting member vibrates largely. Accordingly, the vibrating efficiency can be improved.

The above vehicle seat may further comprise right and left seat back side frames constituting right and left frames of the seat back, and a plate-like pressure-receiving member located in and attached to the right and left seat back side frames via a support wire which laterally bridges the right and left seat back side frames and functions as the elastically supporting member, and the vibrating unit may be attached to a lateral center portion of a back side of the pressure-receiving member with the longitudinal direction of the attaching portion of the vibrating unit being an upper-lower direction.

With this configuration, the support wire for attaching the pressure-receiving member to the right and left seat back side frames is used as the elastically supporting member to improve the vibrating efficiency. Further, since the vibrating unit is attached to the back side of the pressure-receiving member, the vibrating unit can be readily and stably attached to the pressure-receiving member as compared to the configuration in which the vibrating unit is directly attached to the pressure-receiving member.

DESCRIPTION OF EMBODIMENTS

Figure 1:
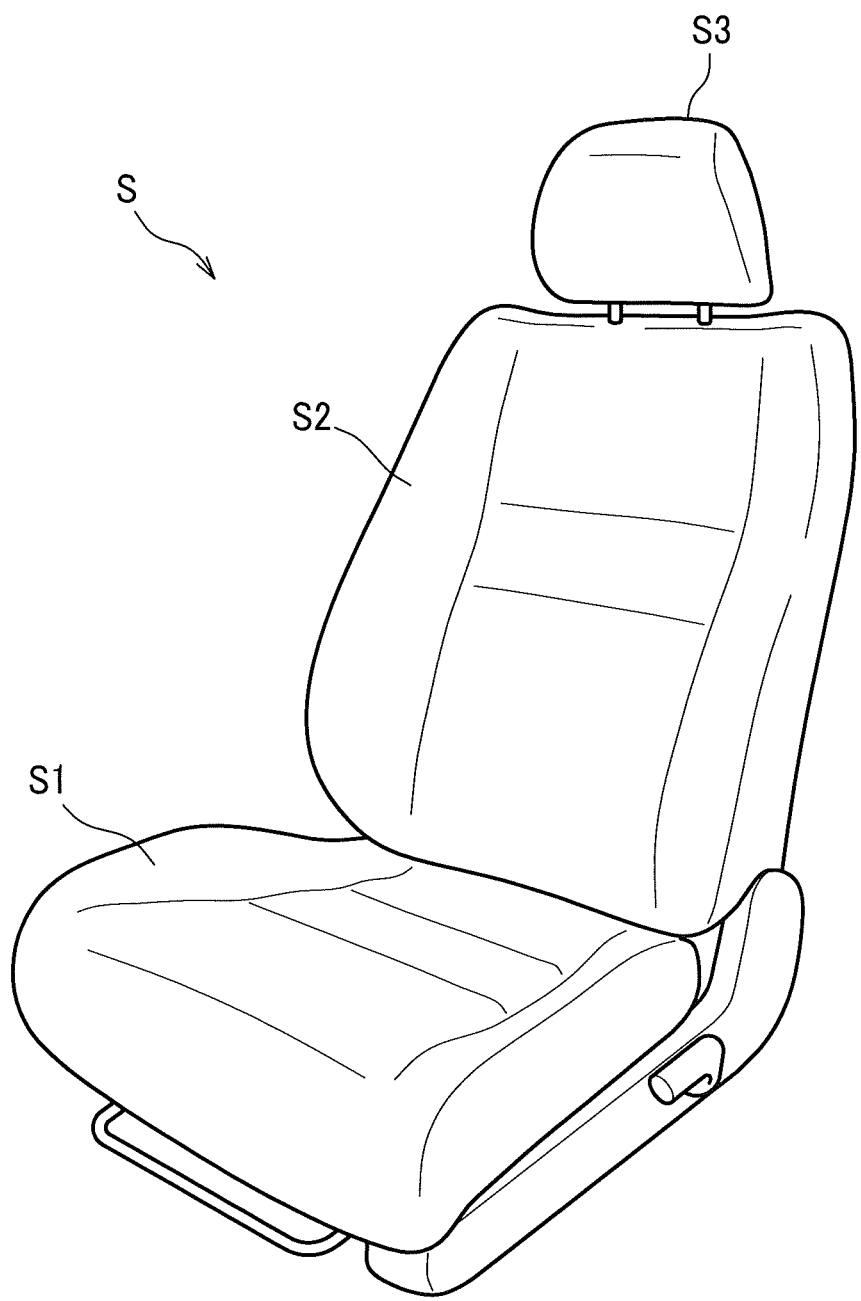
FIG. 1 is a perspective view of a car seat illustrated as one embodiment of a vehicle seat according to the present invention.

With reference to the attached drawings, one embodiment of a vehicle seat according to the present invention will be described below. For example, as seen in FIG. 1, a vehicle seat according to one embodiment is configured as a car seat S installed as a driver's seat of an automobile. The car seat S includes a seat cushion S1, a seat back S2, and a headrest S3, each of which is configured such that a cushion pad made of a cushion material such as urethane foam is covered by a skin material made of synthetic leather, fabric or the like. Herein, the cushion pad, the skin material, and a back cover which is a portion of the skin material and covers the back side of the car seat S are examples of a cover material. In the following description, the front/rear (frontward/rearward) and right/left (lateral) directions are designated as from the view point of an occupant seated on the seat cushion S1.

Figure 2:
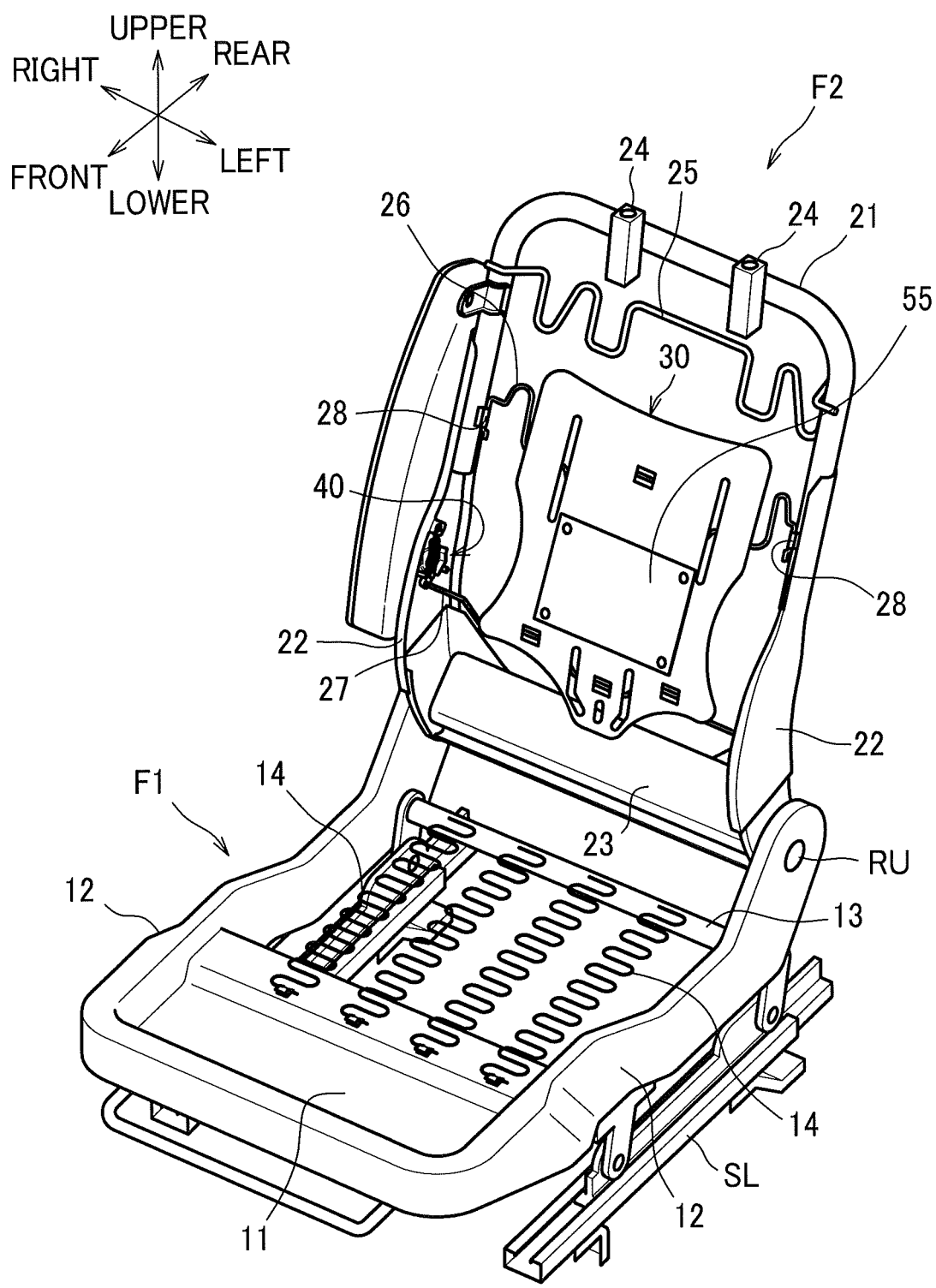
FIG. 2 is a front-side perspective view of a seat cushion frame and a seat back frame embedded in the car seat shown in FIG. 1.

As seen in FIG. 2, the seat cushion S1 includes a seat cushion frame F1 embedded in the seat cushion S1 and constituting a framework of the seat cushion S1, and the seat back S2 includes a seat back frame F2 embedded in the seat back S2 and constituting a framework of the seat back S2. Although not shown in the drawings, a headrest frame constituting a framework of the headrest S3 is embedded in the headrest S3.

The seat cushion frame F1 is formed by presswork and takes a substantially U-shape, as viewed from top, having an open rear portion, and a front portion of the seat cushion frame F1 has a plate-like front frame 11. Cushion side frames 12, 12 extend rearward from the right and left portions of the front frame 11, and rear portions of the cushion side frames 12, 12 are connected by a rear connecting pipe 13 laterally extending between the rear portions of the cushion side frames 12, 12. Four seat cushion springs 14 are laterally arranged side by side and each stretched between the rear connecting pipe 13 and the front frame 11. The seat cushion frame F1 configured as described above is installed on the floor for the driver's seat via slide rails SL such that a position thereof in the front-rear direction is adjustable.

The seat back frame F2 includes an upper pipe frame 21 made by bending a pipe material into an inversed U-shaped configuration, as viewed from the front side, having an open lower portion, right and left seat back side frames 22, 22 holding right and left lower portions of the upper pipe frame 21 and connected thereto by welding, and a lower frame 23 connecting lower end portions of the seat back side frames 22, 22, all of which constitute a vertically-long rectangular frame. The lower end portion of the seat back frame F2 is rotatably connected to the rear end portions of the right and left cushion side frames 12, 12 of the seat cushion frame F1 via a reclining unit RU; this configuration allows the seat back frame F2 to be tiltable in the front-rear directions.

Fixed by welding to an upper horizontal portion of the upper pipe frame 21 of the seat back frame F2 are a pair of right and left support brackets 24, 24 configured to receive a pair of right and left headrest stay (reference numeral omitted) protruding from a lower portion of the headrest S3 shown in FIG. 1. Further, a reinforcement member 25 is provided above a pressure-receiving member 30 in such a manner as to bridge upper portions of right and left vertical portions of the upper frame 21. The reinforcement member 25 is made by bending a rod into a bilaterally symmetrical shape substantially along a flat surface defined by the seat back frame F2.

Figure 3:
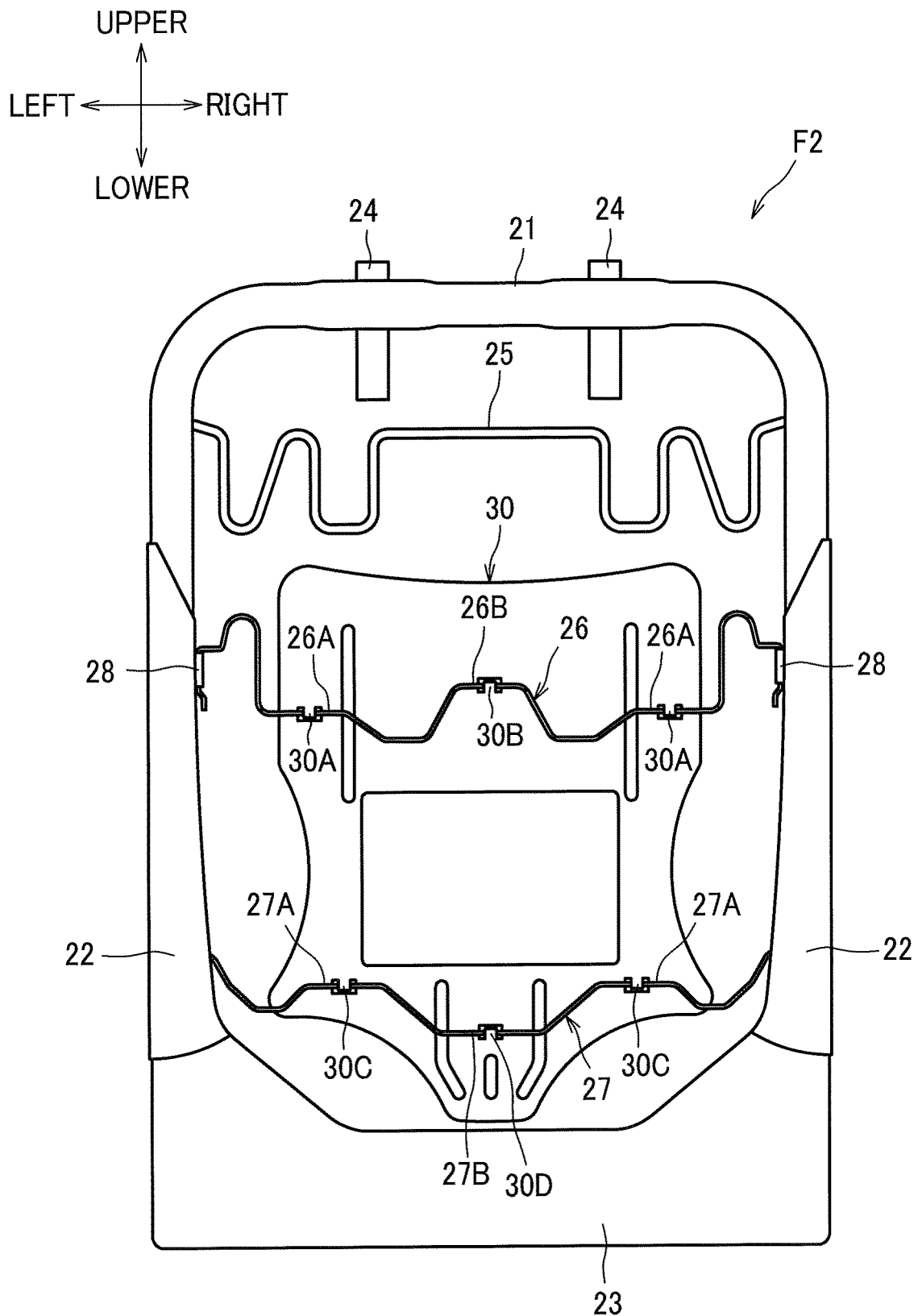
FIG. 3 is a rear view of the seat back frame shown in FIG. 2.

It is noted that as seen in FIGS. 2 and 3, the pressure-receiving member 30 is disposed in the frame-like seat back frame F2; the pressure-receiving member 40 supports the upper body of an occupant seated on the seat cushion S1 while allowing an elastic backward movement thereof. To support the pressure-receiving member 30 elastically movably in the front-rear direction, an upper support wire 26 (i.e., elastically supporting member) is stretched between lower portions of the right and left vertical portions of the upper frame 21, and a lower support wire 27 (i.e., elastically supporting member) is stretched between the right and left seat back side frames 22, 22. Each of the upper support wire 26 and the lower support wire 27 is made by bending a wire such as a piano wire having spring elasticity into a bilaterally symmetrical shape substantially along the flat surface defined by the seat back frame F2. It is preferable that the upper support wire 26 and the lower support wire 27 are bent such that they are away from a vibrating unit 50, because the workability for attaching the upper support wire 26, the lower support wire 27 or the vibrating unit 50 can be improved.

The upper support wire 26 is bent downward at both right and left end portions to follow the right and left vertical portions of the upper frame 21. The both right and left end portions of the upper support wire 26 are held by supporting tabs 28, 28 welded to the right and left vertical portions of the upper frame 21, whereby the end portions of the upper support wire 26 are connected to and supported by the right and left vertical portions of the upper frame 21. The upper support wire 26 is configured such that an intermediate portion thereof for supporting the pressure-receiving member 30 is positioned lower than both end portions connected to and supported by the right and left supporting tabs 28, 28 and that the intermediate portion has side support portions 26A, 26A and a center support portion 26B which is positioned higher than the both side support portions 26A, 26A to thereby form a crest portion protruding upward in the upper-lower direction.

The both right and left end portions of the lower support wire 27 are connected to toggle support mechanisms 40 (only right-side toggle support mechanism is shown in FIG. 2) provided on the inner surfaces of the right and left seat back side frames 22, 22, respectively. The lower support wire 27 is configured such that an intermediate portion thereof for supporting the pressure-receiving member 30 is positioned lower than both end portions connected to the toggle support mechanisms 40 and that the intermediate portion has side support portions 27A, 27A and a center support portion 27B which is positioned lower than the both side support portions 27A, 27A to thereby form a crest portion protruding in the upper-lower direction.

The toggle support mechanism 40 includes a swingable link member configured to resist the tensile force of an extension coil spring and to be swingable backward after overcoming the dead point (at which point the swingable link member is movable in any directions on the mechanism), and each of the right and left end portions of the lower support wire 27 is connected to the swingable link member. The extension coil spring used in the toggle support mechanism 40 has an appropriate tensile force set such that the swingable link member can overcome the dead point and swing rearward when a backward movement load equal to or greater than a predetermined value is applied to each end portion of the lower support wire 27.

Figure 4:
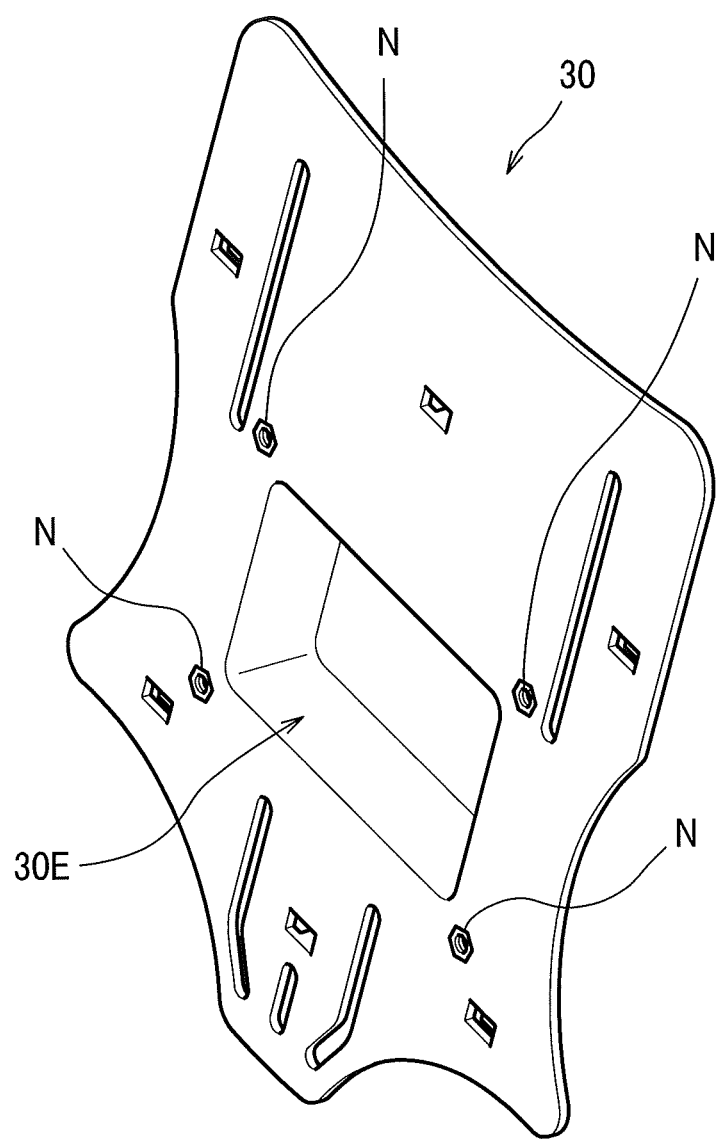
FIG. 4 is a front-side perspective view of a pressure-receiving member shown in FIG. 2.
Figure 5:
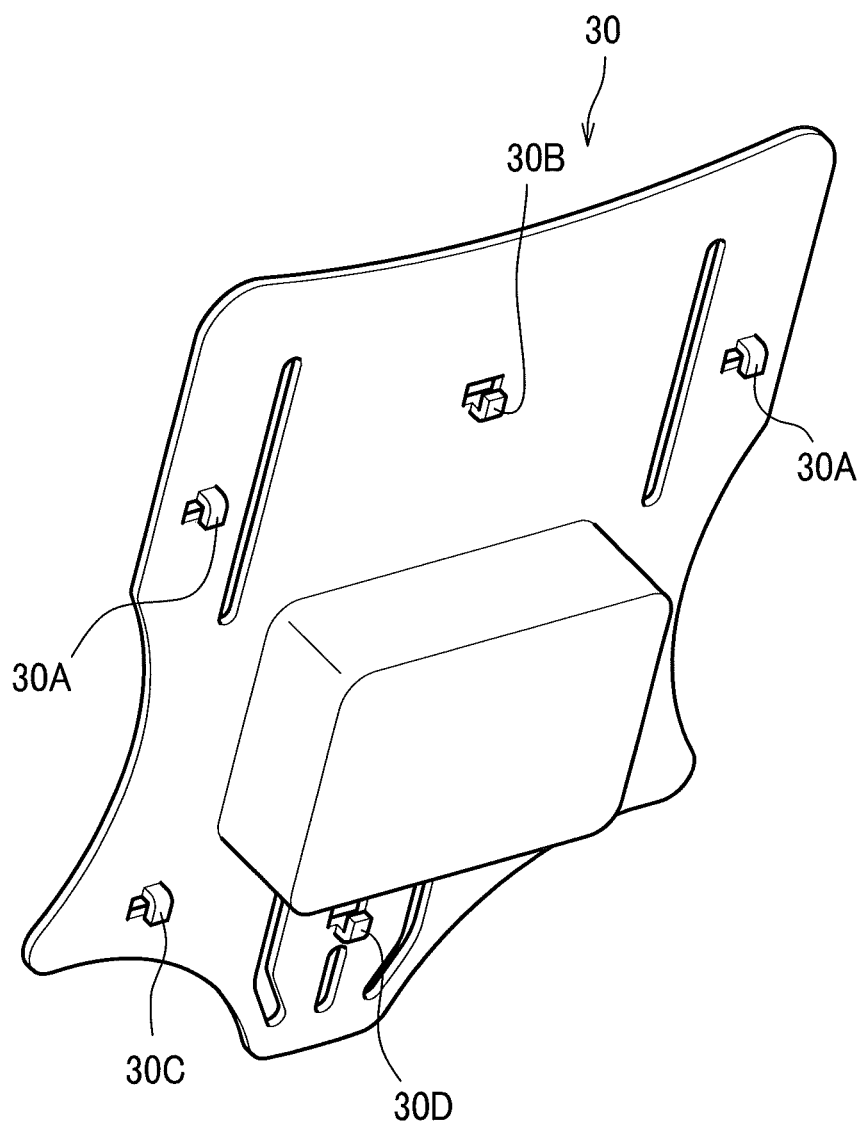
FIG. 5 is a rear-side perspective view of the pressure-receiving member shown in FIG. 4.

Herein, the pressure-receiving member 30 is made of a plastic plate-like member for elastically supporting the upper body of the occupant seated on the seat cushion S1 in a manner that allows a backward movement thereof; for example, as seen in FIGS. 4 and 5, the pressure-receiving member 30 is substantially in the shape of a pentagon with the vertex directed downward. The rear surface (back side) of the pressure-receiving member 30 has hook-shaped retaining portions 30A, 30A and a hook-shaped retaining portion 30B, which are integrally formed with the rear surface of the pressure-receiving member 30; the hook-shaped retaining portions 30A, 30A are configured to be engageable from above with the right and left side support portions 26A, 26A of the upper support wire 26 shown in FIG. 3, and the hook-shaped retaining portion 30B is configured to be engageable from below with the center support portion 26B of the upper support wire 26. Similarly, the rear surface (back side) of the pressure-receiving member 30 has hook-shaped retaining portions 30C, 30C and a hook-shaped retaining portion 30D, which are integrally formed with the rear surface of the pressure-receiving member 30; the hook-shaped retaining portions 30C, 30C are configured to be engageable from above with the right and left side support portions 27A, 27A of the lower support wire 27 shown in FIG. 3, and the hook-shaped retaining portion 30D is configured to be engageable from below with the center support portion 27B of the lower support wire 27.

Figure 6:
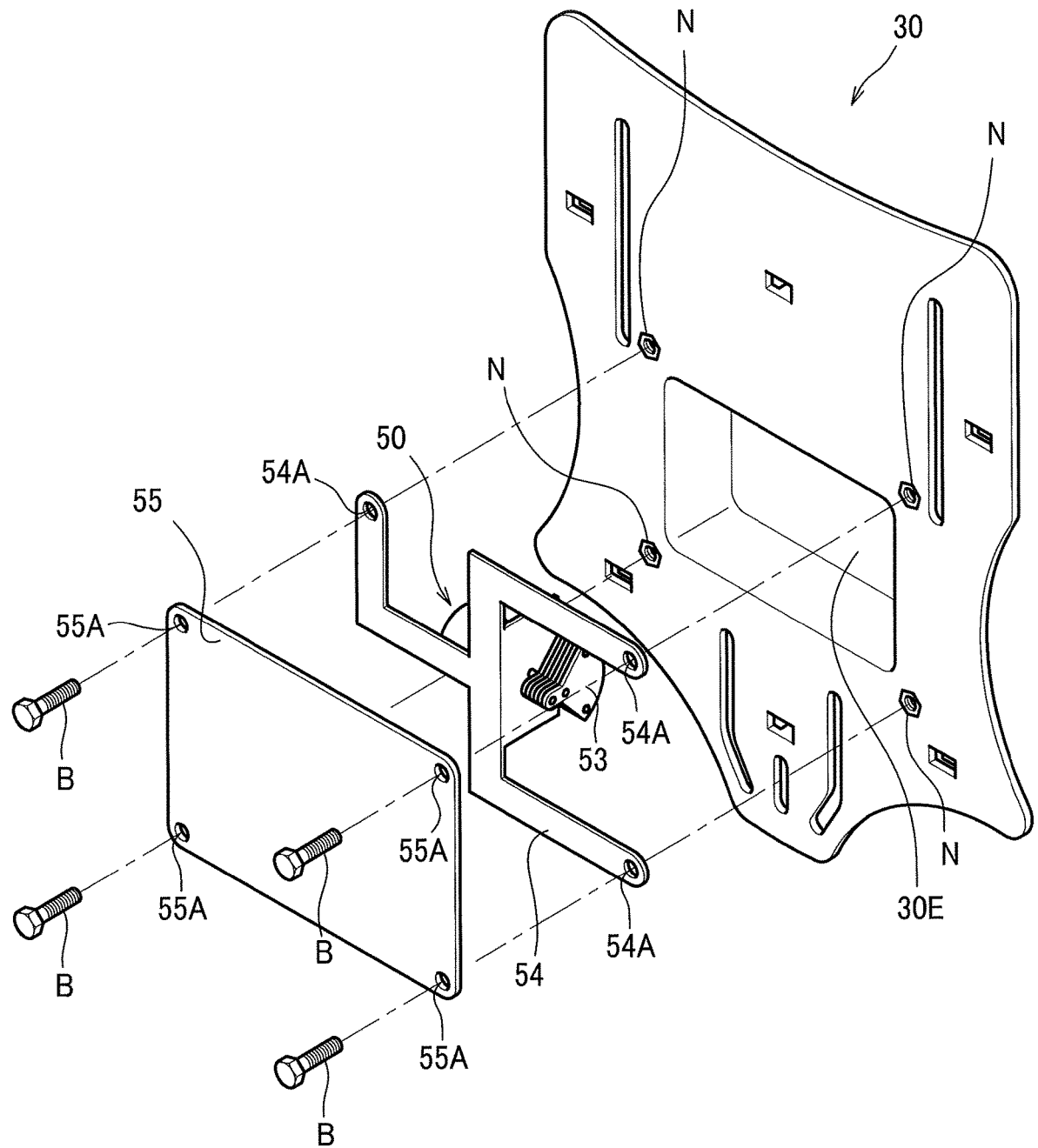
FIG. 6 is an exploded perspective view of the pressure-receiving member and a second cover member shown in FIG. 2, as viewed from the front side.
Figure 7:
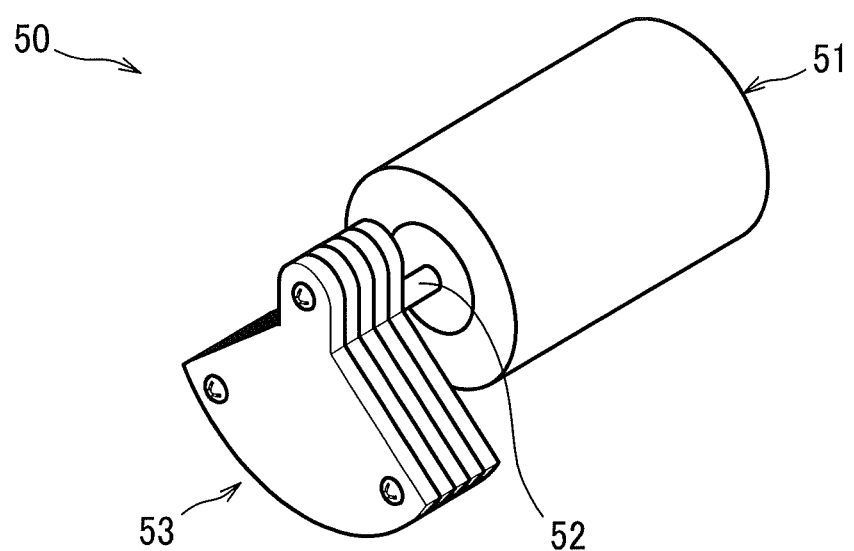
FIG. 7 is an enlarged perspective view of a vibrating unit shown in FIG. 6.

As seen in FIGS. 6 and 7, the pressure-receiving member 30 has a storage recess portion 30E for accommodating the vibrating unit 50; the storage recess portion 30E is integrally formed with the pressure-receiving member 30. The storage recess portion 30E opens at the front surface (front side) of the pressure-receiving member 30 and bulges out from the rear surface (back side) of the pressure-receiving member 30; as viewed from the front side, the storage recess portion 30E is in the shape of a horizontally long rectangle. Nuts N as fixing members for fixing a mounting bracket 54 to be described later are embedded in the pressure-receiving member 30 by insert molding at positions around four corners of the rectangular opening of the storage recess portion 30E. The bottom portion of the storage recess portion 30E functions as a first cover member (interference suppressing member) to prevent interference of the vibrating unit 50 and the cushion pad covering the rear side of the seat back frame F2.

The vibrating unit 50 includes a drive motor (actuator) 51, a vibrating weight 53 attached to a rotary shaft 52 of the drive motor 51, and a mounting bracket 54 attached to the drive motor 51. The vibrating weight 53 includes a plurality of fan-shaped plates laminated to form an integral block having a fan shape as viewed from the front side, and the rotary shaft 52 is attached to a position offsetting from the center of gravity of the vibrating weight 53 so that the rotation of the rotary shaft 52 generates vibration of a predetermined frequency. Vibration generated by the vibrating unit 50 can be changed to have an appropriate frequency for providing a massaging effect or an arousal effect to the driver seated on the seat cushion S1 by changing the rpm (revolutions per minute) of the drive motor 51. A controller for controlling operation of the vibrating unit 50 may be installed, for example, at the driver's seat at a position frontward of the car seat S.

The mounting bracket 54 has three bolt insertion holes 54A corresponding to at least three nuts N out of the four nuts N of the pressure-receiving member 30 shown in FIG. 6. In this embodiment, a cover plate 55 which is attached to the front surface (front side) of the pressure-receiving member 30 together with the mounting bracket 54 is provided as a second cover member (interference suppressing member). The cover plate 55 is a rectangular plate-like member having a size to cover the storage recess portion 30E of the pressure-receiving member 30, and four bolt insertion holes 55A are formed at four corners of the cover plate 55, corresponding to the positions of the four nuts N. The cover plate 55 is attached to the front surface (front side) of the pressure-receiving member 30 and thus covers the storage recess portion 30E using four bolts B that are threaded into the four nuts N of the pressure-receiving member 30 through the bolt insertion holes 55A of the cover plate 55 and the bolt insertion holes 54A of the mounting bracket 54. Accordingly, the vibrating unit 50 is attached to the pressure-receiving member 30 without requiring spring members. This can decrease the number of parts.

Next, operation and advantageous effects of the car seat S configured as an embodiment of a vehicle seat according to the present invention will be described. When a driver drives a car while sitting on the seat cushion S1 of the car seat S shown in FIG. 1 which is arranged as the driver's seat of the car, if a pressing force applied from the upper body of the occupant to the seat back S2 is within a predetermined range (i.e., in a normal driving state or in a parked state), the upper support wire 26 and the lower support wire 27 shown in FIGS. 2 and 3 are caused to elastically and moderately deform backward, with the result that the upper body of the occupant moderately sinks into the seat back S2 while being retained in a stable driving posture.

When the vibrating unit 50 operates by the operation of the controller (not shown) installed, for example, at the driver's seat at a position frontward of the car seat S during the time that the upper body of the occupant seated on the seat cushion S1 of the car seat S moderately sinks into the seat back S2 as described above, the vibrating weight 53 rotates together with the rotary shaft 52 of the drive motor 51, whereby the vibrating unit 50 generates vibration. The vibration from the vibrating unit 50 is directly transmitted to the entire pressure-receiving member 30 without being transmitted to spring members, so that the vibration can be transmitted efficiently from the pressure-receiving member 30 to the upper body and other part of the occupant via the cushion pad.

Namely, in the car seat S according to one embodiment, in order to provide a massaging effect or an arousal effect to the occupant seated on the seat cushion S1, desired vibration generated by the vibrating unit 50 can be transmitted efficiently from the seat back S2 to the upper body of the occupant. In this embodiment, since the vibrating unit 50 is accommodated in the storage recess portion 30E bulging out from the rear surface (back side) of the pressure-receiving member 30, and the vibrating unit 50 is disposed backward of the front surface which is a pressure-receiving surface of the pressure-receiving member 30, the occupant does not feel uncomfortable which feeling would otherwise be caused due to the vibrating unit 50 contacting the upper body of the occupant supported by the seat back S2.

Further, in the car seat S according to one embodiment, since the mounting bracket 54 for the vibrating unit 50 and the cover plate 55 are attached (fixed) to the periphery of the storage recess portion 30E of the pressure-receiving member 30, the vibrating unit 50 can operate stably by suppressing interference between the vibrating unit 50 and the cushion pad (not shown). Further, the storage recess portion 30E in which the vibrating unit 50 is accommodated is covered by the cover plate 55; this configuration can prevent dust from entering the storage recess portion 30E. Further, the bottom portion of the storage recess portion 30E functions as the first cover member (interference suppressing member) to prevent interference between the vibrating unit 50 and the cushion pad covering the rear side of the seat back frame F2.

Further, since the nuts N as the fixing members for fixing the mounting bracket 54 for the vibrating unit 50 are provided by insert molding at positions around the opening of the storage recess portion 30E of the pressure-receiving member 30, the attachment operation for the mounting bracket 54 is easily performed, and thanks to the enhanced rigidity of the pressure-receiving member 30 the vibration from the vibrating unit 50 can be efficiently transmitted to the entire pressure-receiving member 30.

Further, the vibrating unit 50 is disposed at a position avoiding the upper support wire 26 and the lower support wire 27, that is, at a height position between the upper support wire 26 and the lower support wire 27; accordingly, the upper support wire 26 and the lower support wire 27 do not obstruct the assembly of the vibrating unit 50, and hence the workability for assembling the vibrating unit 50 can be improved.

Further, the upper support wire 26 and the lower support wire 27 are provided to connect right and left portions of the seat back frame F2, and the hook-shaped retaining portion 30B configured to be engageable from below with the center support portion 26B of the upper support wire 26 and the hook-shaped retaining portion 30D configured to be engageable from below with the center support portion 27B of the lower support wire 27 are arranged above and below the vibrating unit 50; with this configuration, since the pressure-receiving member 30 retains the upper support wire 26 and the lower support wire 27 at an area of the pressure-receiving member 30 where large vibration generates, it is possible to suppress an abnormal noise, when the vibrating unit vibrates, from being generated due to interference of the pressure-receiving member 30 with the upper support wire 26 and the lower support wire 27 which are examples of wire members.

Although the car seat S as one embodiment of the vehicle seat according to the present invention has been described above, the vehicle seat of the present invention is not limited to the car seat S in this embodiment. It is to be understood that modifications and changes may be made to any of the specific configurations where necessary.

In the following modified embodiments, parts similar to those previously described in the above embodiment are denoted by the same reference numerals and detailed description thereof will be omitted.

Figure 8:
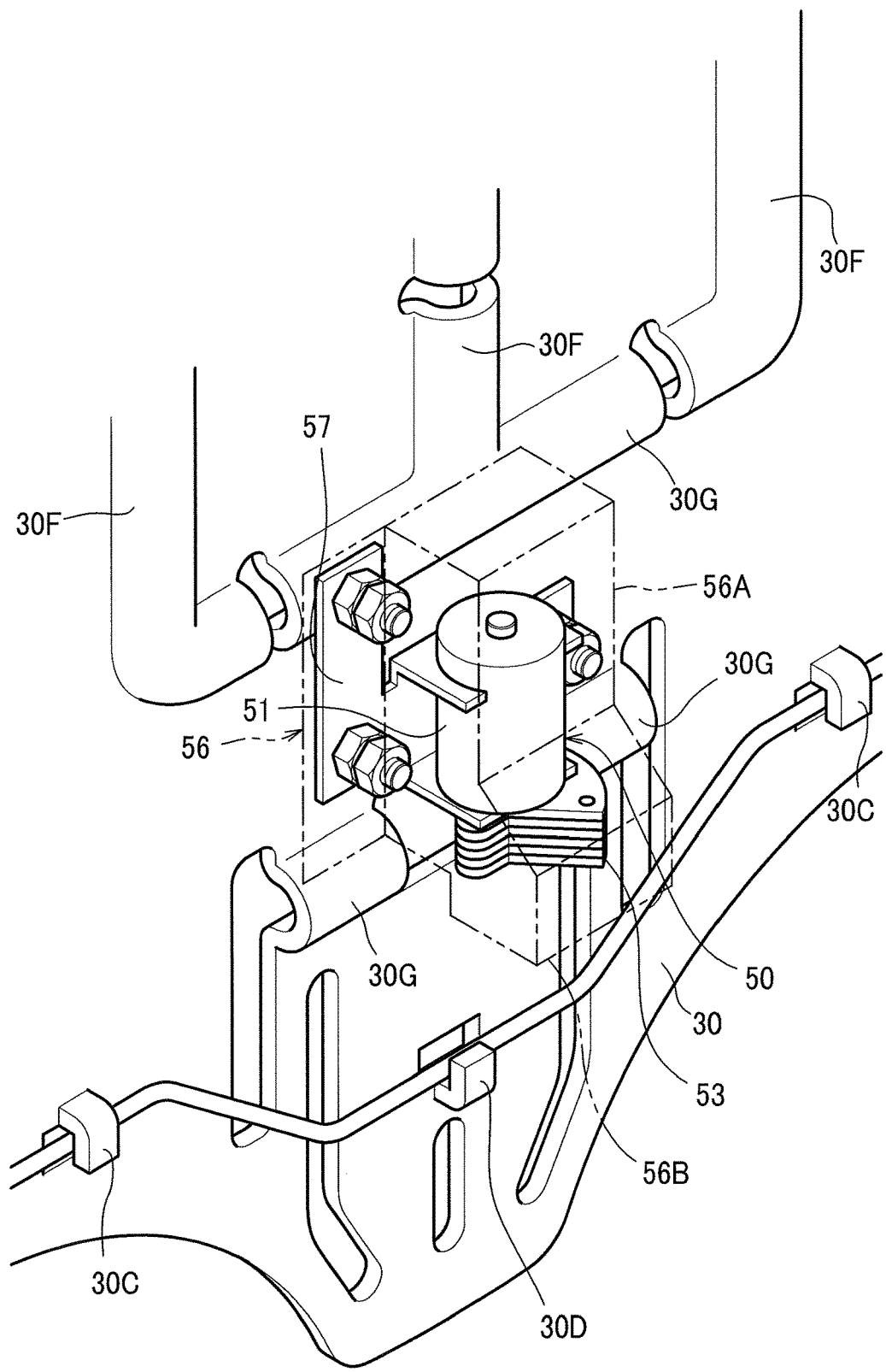
FIG. 8 is a partly enlarged perspective view of the vibrating unit vertically mounted on the back side of the pressure-receiving member and a first cover member, as viewed from the left side, which constitute a modified embodiment of the car seat according to the one embodiment.
Figure 9:
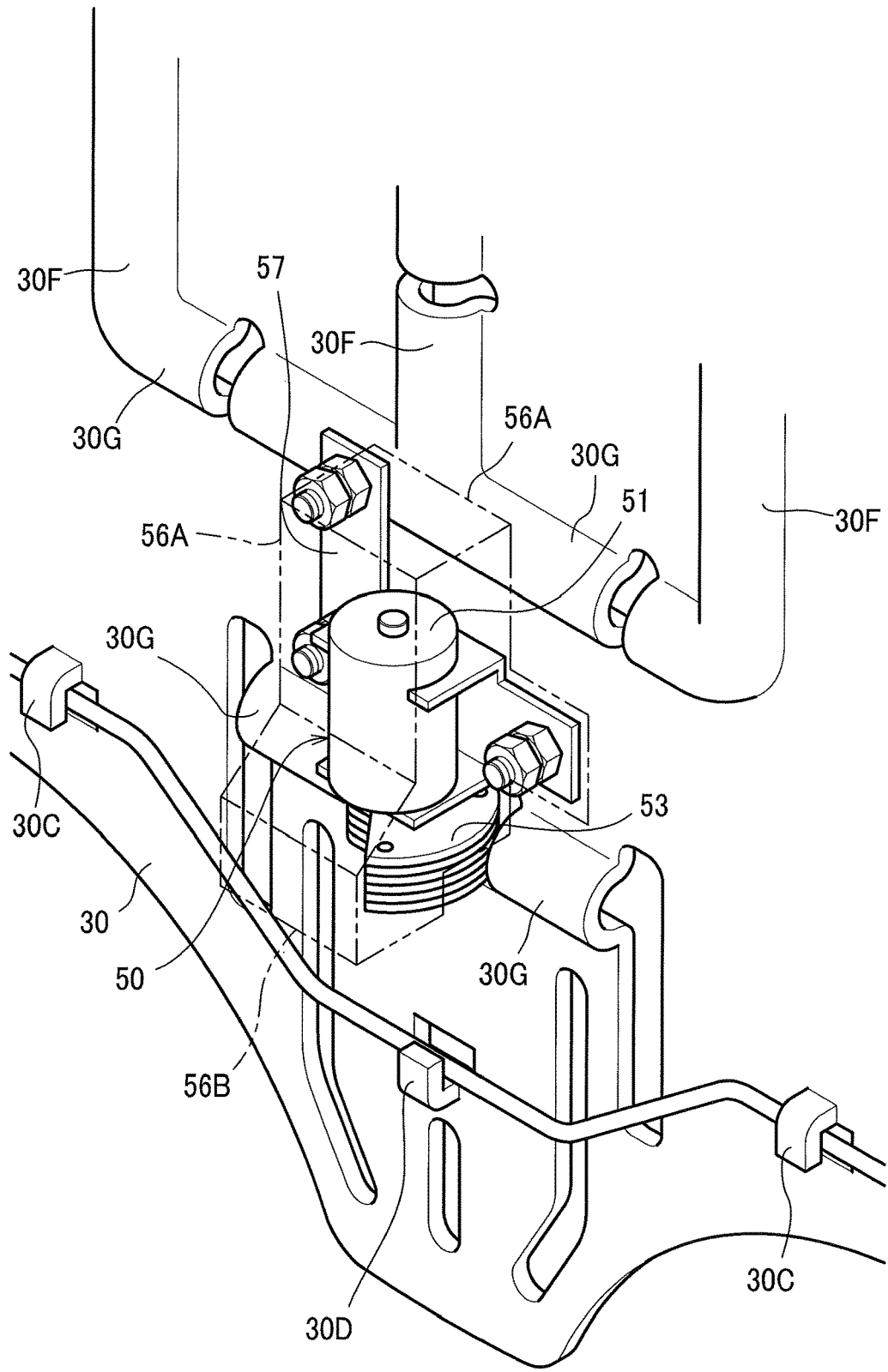
FIG. 9 is a partly enlarged perspective view of the vibrating unit and the first cover member shown in FIG. 8, as viewed from the right side.
Figure 10:
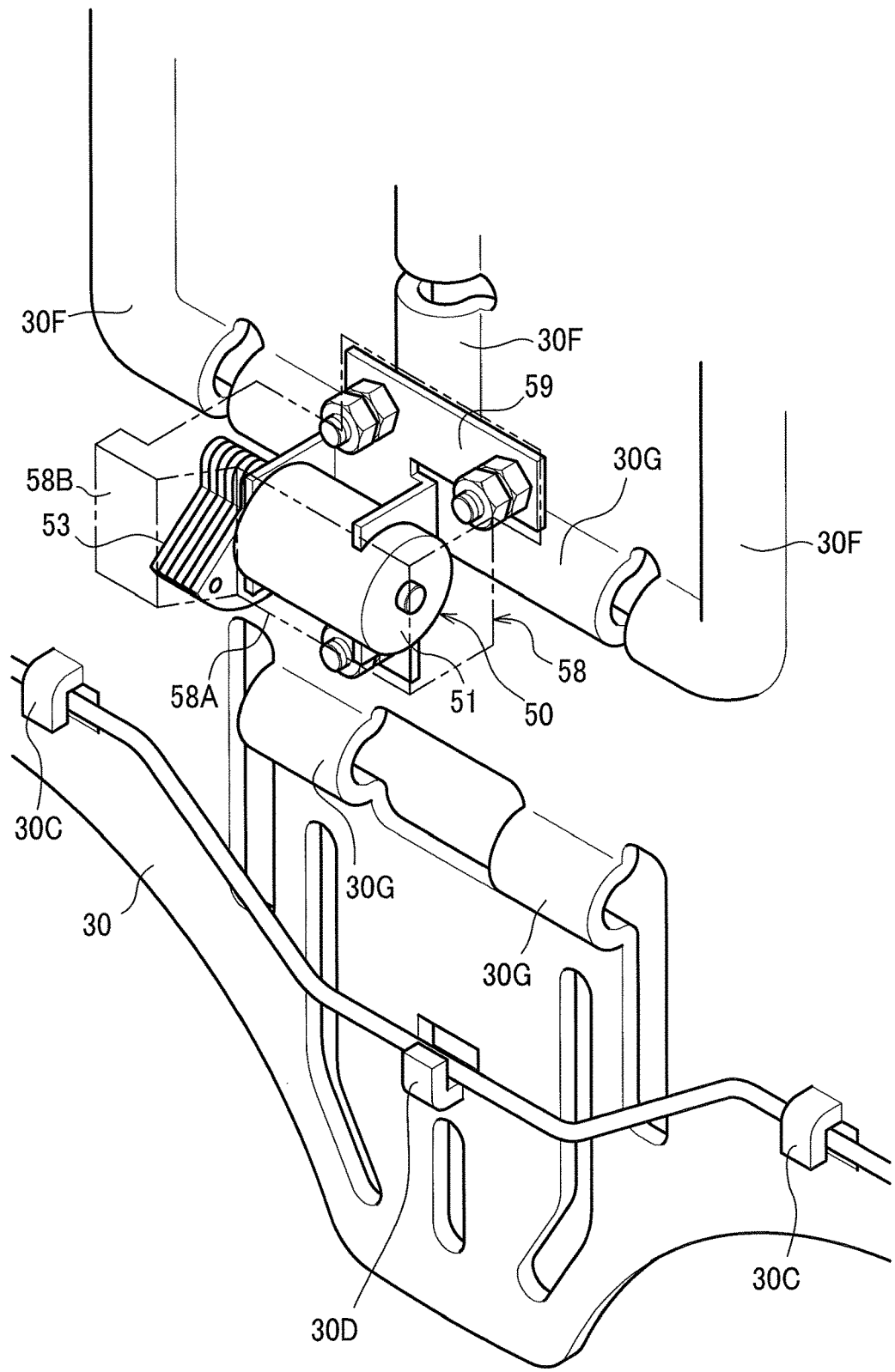
FIG. 10 is a partly enlarged perspective view of a vibrating unit laterally mounted on the back side of the pressure-receiving member and the first cover member, as viewed from the right side, which constitute another modified embodiment of the car seat according to the one embodiment.

For example, as seen in FIGS. 8 to 10, the pressure-receiving member 30 may include a plurality of vertical beads 30F and horizontal beads 30G which bulge out from the rear surface (back side) of the pressure-receiving member 30. With this configuration, since the presence of the plurality of vertical beads 30F and horizontal beads 30G can enhance the rigidity of the pressure-receiving member 30, the vibration generated by the vibrating unit 50 can be transmitted to the entire pressure-receiving member 50.

Further, as seen in FIGS. 8 and 9, the vibrating unit 50 may be installed on the rear surface (back side) of the pressure-receiving member 30 with the rotary shaft directed vertically in the upper-lower direction. In this modification, in order to stably operate the vibrating unit 50 by suppressing interference between the vibrating unit 50 and the cushion pad (not shown), it is preferable to provide a cover member 56 (i.e., first cover member, interference suppressing member) which includes a motor cover portion 56A configured to cover the drive motor 51, and a weight cover portion 56B configured to protrude outward from the motor cover portion 56A to cover a region in which the vibrating weight 53 rotates. In this modification, a stepped portion may be provided which is bent and protrudes outward from the motor cover portion 56A to the weight cover portion 56B. This cover member 56 is attached to the pressure-receiving member 30, together with the mounting bracket 57 of the vibrating unit 50, by screwing bolts.

Further, as seen in FIG. 10, the vibrating unit 50 may be installed on the rear surface (back side) of the pressure-receiving member 30 with the rotary shaft directed laterally in the right-left direction. In this modification, in order to stably operate the vibrating unit 50 by suppressing interference between the vibrating unit 50 and the cushion pad (not shown), it is preferable to provide a cover member 58 (i.e., first cover member) which includes a motor cover portion 58A configured to cover the drive motor 51, and a weight cover portion 58B configured to protrude outward from the motor cover portion 58A to cover a region in which the vibrating weight 53 rotates. This cover member 58 is attached to the pressure-receiving member 30, together with the mounting bracket 59 of the vibrating unit 50, by screwing bolts. It is noted that a portion of the vibrating unit 50 is accommodated in a recess portion formed between the two horizontal beads 30G that are arranged one above the other, with the result that the size of the car seat S can be reduced by efficiently using a space in the recess portion.

According to these modifications, providing the cover member 56, 58 at the back side of the vibrating unit 50 can suppress interference between the back cover (cover material) covering the back side of the seat back frame F2 and the vibrating unit 50. Further, the cover member 56, 58 consists of the motor cover portion 56A, 58A and the weight cover portion 56B, 58B; this configuration makes it possible to reduce the size of the cover member 56, 58 as well as to suppress interference with the back cover due to vibration of the eccentric weight. Further, since the weight cover portion 56B, 58B protrudes outward from the motor cover portion 56A, 58A, the rigidity of the cover member 56, 58 can be enhanced.

Figure 11:
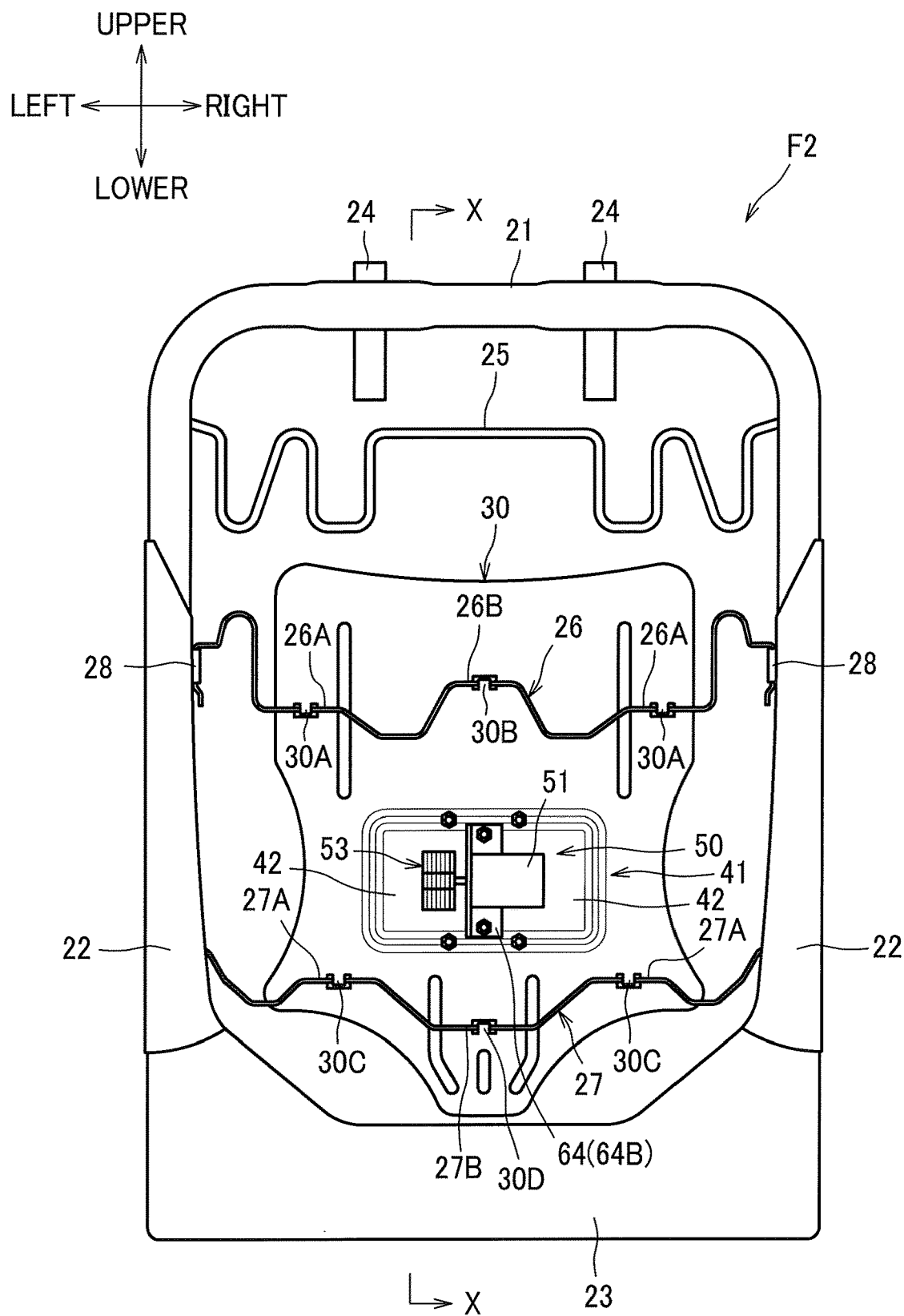
FIG. 11 is a rear view of the seat back frame according to a further modification.
Figure 12:
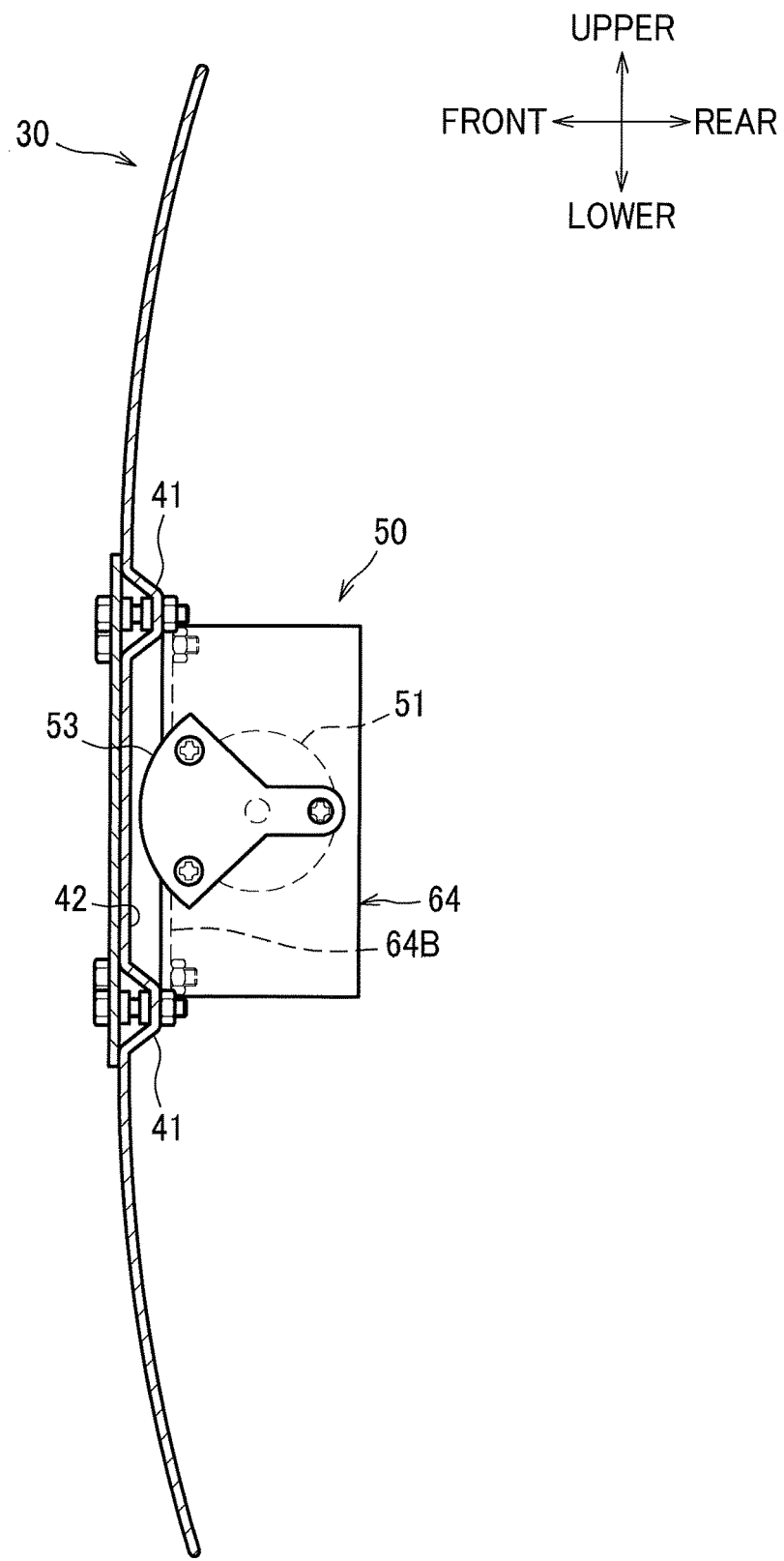
FIG. 12 is a sectional view taken along the line X-X of FIG. 11.

Further, in another modified embodiment shown in FIGS. 11 and 12, the vibrating unit 50 is attached to the upper support wire 26 and the lower support wire 27 via the pressure-receiving member 30 with the vibrating unit 50 fixed to the rear surface of the pressure-receiving member 30. To be more specific, the vibrating unit 50 is attached to the rear surface of the pressure-receiving member 30 at the center portion coinciding with the vertical center portion and the horizontal center portion of the rear surface with the longitudinal direction of an attaching portion 64B of the mounting bracket 64 being the upper-lower direction. Furthermore, although the vibrating unit 50 is attached to the upper and lower support wires 26, 27 via the pressure-receiving member 30, as viewed from the rear side, the vibrating unit 50 is attached to the rear surface of the pressure-receiving member 30 at a position avoiding the upper support wire 26 and the lower support wire 27, that is, at a height position between the upper support wire 26 and the lower support wire 27.

As seen in FIGS. 11 and 12, a bead portion 41 is formed at the vicinity of the center of the rear surface of the pressure-receiving member 30; the bead portion 41 protrudes rearward and functions as a reinforcement protrusion. The bead portion 41 consists of three vertical bead portions laterally arranged side by side, and two horizontal bead portions connecting the end portions of the vertical bead portions, and has a frame-like shape. In other words, at the vicinity of the center of the rear surface of the pressure-receiving member 30, the region surrounded by the bead portion 41 (i.e., vertical bead portions and horizontal bead portions) forms a recess portion 42 which is recessed frontward. Further, as seen in FIG. 12, the entire pressure-receiving member 30 curves such that the rear surface thereof is recessed in the vertical section at the vicinity of the vertical center of the rear surface. As described above, the pressure-receiving member 30 includes the bead portion 41 and the recess portion 42 (asperities) and curves as a whole, with the result that the rigidity of the pressure-receiving member 30 is enhanced.

The vibrating unit 50 is installed with the drive motor 51 fixed to the plate-like mounting bracket 64 that is made of metal or plastic resin and bent to have a substantially L-shaped form. Further, the mounting bracket 64 is fixed to the pressure-receiving member 30 by screws with the attaching portion 64B thereof placed on the middle vertical bead portion.

As seen in FIG. 12, a portion of the vibrating weight 53 protrudes frontward beyond the front surface of the mounting bracket 64 (attaching portion 64B), so that the vibrating unit 50 is installed with the portion thereof (the portion of the vibrating weight 53) accommodated in the recess portion 42.

With this configuration, the vibrating unit 50 is attached to the lateral center portion of the upper support wire 26 and the lateral center portion of the lower support wire 27 via the pressure-receiving member 30 with the longitudinal direction of the attaching portion 64B being the upper-lower direction orthogonal to the right-left direction in which the support wires 26, 27 are laid; therefore, the vibrating unit 50 can vibrate a narrow area including the center portions of the support wires 26, 27. Accordingly, the support wires 26, 27 can be caused to vibrate largely in the upper-lower directions as well as in the right-left directions as if a force is applied as a point load at the center (easily deformable portion) of a stretched wire member.

Further, since the vibrating unit 50 is installed with a portion thereof accommodated in the recess portion 42 formed in the rear surface of the pressure-receiving member 30, the amount of backward protrusion of the vibrating unit 50 can be restricted. Further, since the vibrating unit 50 is attached to the vertical center portion of the rear surface of the pressure-receiving member 30 wherein the pressure-receiving member curves such that the rear surface thereof is recessed in the vertical section, the amount of backward protrusion of the vibrating unit 50 can also be restricted. These configurations make it possible to prevent the seat equipped with the vibrating unit 50 from upsizing in the front-rear direction. It is noted that providing the recess portion 42 in the rear surface of the pressure-receiving member 30 or curving the pressure-receiving member 30 such that the rear surface thereof is recessed results in the formation of a frontwardly protruding portion (portion protruding toward the occupant) on the pressure-receiving member 30; however, no problem will arise because the cushion material (not shown) is disposed between the occupant and the pressure-receiving member 30.

In the above embodiment, the both end portions of the lower support wire 27 are supported by the toggle support mechanisms 40; however, one of the end portions only may be supported by the toggle support mechanism 40, or the both end portions may be supported by the right and left side frames without using the toggle support mechanisms 40.

In the above embodiment, the vibrating unit 50 is provided in the vicinity of the vertical center of the pressure-receiving member 30; however, the vibrating unit 50 may be provided at a position below the vertical center portion. In the case where the pressure-receiving member 30 is provided at a position closer to the lower side of the seat back S2, the vibration from the vibrating unit 50 can be stably transmitted to the occupant because a lower part (lumbar region and surrounding region) of the upper body of the occupant normally contacts the seat back S2.

The car seat S according to one embodiment is used for a car of which the driver's seat is arranged on the right side; however, if the structure of the car seat S is reversed in the right-left direction, the car seat S is applicable to a car of which the driver's seat is arranged on the left side.

Further, the car seat S according to one embodiment may be configured as a bucket-type car seat in which the seat cushion S1, the seat back S2 and the headrest S3 are integrally formed.

Further, the vehicle seat according to the present invention may be configured as a seat for marine vessel or aircraft.

The invention claimed is:

1. A vehicle seat comprising:
a frame that constitutes a framework of the vehicle seat;
a pressure-receiving member located inside of the frame, attached movably to the frame by a first wire and a second wire, and configured to support an occupant seated on the vehicle seat, the pressure-receiving member being a plate-shaped member having an occupant-side surface facing the occupant seated on the vehicle seat and a rear surface facing opposite to the occupant-side surface, the pressure-receiving member including:
a first horizontal bead and a second horizontal bead each bulging out from the rear surface of the pressure-receiving member to form a protrusion elongate in a horizontal direction, the first horizontal bead being spaced apart from the second horizontal bead, the first horizontal bead and the second horizontal bead each having an apex; and
a vibrating unit comprising:
a motor having a rotation axis, and
an eccentric weight attached to a rotary shaft of the motor and rotatable on the rotation axis,
the vibrating unit being fixed to the apex of the first horizontal bead and the apex of the second horizontal bead,
the eccentric weight of the vibrating unit being partially located between the first horizontal bead and the second horizontal bead, and partially accommodated in a space defined between the rear surface of the pressure-receiving member and an imaginary plane extending from the apex of the first horizontal bead to the apex of the second horizontal bead,
wherein the first wire is attached to an upper portion of the rear surface and the second wire is attached to a lower portion of the rear surface, and
wherein the first horizontal bead, the second horizontal bead, and the vibrating unit are positioned between the first wire and the second wire.

2. The vehicle seat according to claim 1, wherein the pressure-receiving member further includes a vertical bead bulging out from the surface of the pressure-receiving member and extending in a direction perpendicular to the horizontal direction.

3. The vehicle seat according to claim 2, wherein the surface from which the first horizontal bead, the second horizontal bead, and the vertical bead bulge out is a rear surface that is opposite to an occupant-side surface of the pressure-receiving member.

4. The vehicle seat according to claim 2, wherein the pressure-receiving member has a through hole cutting across the width of the vertical bead, the through hole being located above the motor.

5. The vehicle seat according to claim 1, wherein the first wire and the second wire are attached to the frame and located on a back side relative to an occupant-side surface of the pressure-receiving member, the first wire and the second wire having an elasticity to render the pressure-receiving member movable.

6. The vehicle seat according to claim 5,
wherein the frame comprises a seat back frame which constitutes a framework of a seat back of the vehicle seat and by which the pressure-receiving member is supported via the first wire and the second wire,
wherein the second wire includes a downwardly-recessed portion, and wherein
the vibrating unit and the downwardly-recessed portion are aligned in an upward-downward direction of the seat back frame.

7. The vehicle seat according to claim 1, wherein
the first horizontal bead and the second horizontal bead are spaced apart in the horizontal direction, and
the pressure-receiving member has a through hole located between the first horizontal bead and the second horizontal bead, the eccentric weight being partially located in the through hole.

8. The vehicle seat according to claim 1, further comprising a plurality of fixing members that comprise two fixing members arranged in a line parallel to the rotation axis of the motor.

9. The vehicle seat according to claim 1, wherein the first horizontal bead and the second horizontal bead are spaced apart in a direction perpendicular to the horizontal direction.

10. The vehicle seat according to claim 1, wherein the vibrating unit is positioned with the rotation axis oriented in a direction perpendicular to the horizontal direction.

11. The vehicle seat according to claim 10,
wherein the pressure-receiving member further includes a vertical bead bulging out from the surface of the pressure-receiving member and extending in a direction perpendicular to the horizontal direction, and
wherein the motor of the vibrating unit is located so that the rotation axis of the motor is aligned with the vertical bead of the pressure-receiving member as viewed from an occupant side of the pressure-receiving member, and the vertical bead is located above the motor.

12. A method for manufacturing a vehicle seat, the method comprising:
providing a frame as a framework of the vehicle seat;
providing a pressure-receiving member that is a plate-shaped member having an occupant-side surface facing an occupant seated on the vehicle seat and a rear surface facing opposite to the occupant-side surface, the pressure-receiving member comprising a first horizontal bead and a second horizontal bead bulging out from a surface of the pressure-receiving member to form a protrusion elongate in a horizontal direction, the first horizontal bead being spaced apart from the second horizontal bead, the first horizontal bead and the second horizontal bead each having an apex;
providing a vibrating unit including a motor having a rotation axis, and an eccentric weight attached to a rotary shaft of the motor and rotatable on the rotation axis;
locating, and affixing to the apex of the first horizontal bead and the apex of the second horizontal bead, the vibrating unit so that the eccentric weight of the vibrating unit is partially located between the first horizontal bead and the second horizontal bead, and partially accommodated in a space defined between the surface of the pressure-receiving member and an imaginary plane extending from the apex of the first horizontal bead to the apex of the second horizontal bead;

attaching the pressure-receiving member to the frame movably by a first wire and a second wire so as to support the occupant seated on the vehicle seat,
  wherein the first wire is attached to an upper portion of the rear surface and the second wire is attached to a lower portion of the rear surface, and
wherein the first horizontal bead, the second horizontal bead, and the vibrating unit are positioned between the first wire and the second wire.

13. A vehicle seat comprising:
a frame that constitutes a framework of the vehicle seat;
a pressure-receiving member located inside of the frame, attached movably to the frame by a first wire and a second wire, and configured to support an occupant seated on the vehicle seat, the pressure-receiving member being a plate-shaped member having an occupant-side surface facing the occupant seated on the vehicle seat and a rear surface facing opposite to the occupant-side surface, the pressure-receiving member comprising a plurality of beads bulging out from the rear surface of the pressure-receiving member to form a plurality of protrusions, the pressure-receiving member having a through hole; and
a vibrating unit comprising:
  a motor including a rotary shaft and an eccentric weight attached to the rotary shaft, the vibrating unit being fixed to the pressure-receiving member,
  wherein the eccentric weight of the vibrating unit being partially located between the plurality of beads and partially located in the through hole,
  wherein the first wire is attached to an upper portion of the rear surface and the second wire is attached to a lower portion of the rear surface, and
wherein the first horizontal bead, the second horizontal bead, and the vibrating unit are positioned between the first wire and the second wire.

14. The vehicle seat according to claim 13, wherein the through hole is provided to cut across a portion of the plurality of beads.

* * * * *